April 11, 1944.   W. L. SCHWARTZ   2,346,192

SPUR CENTER HEAD AND METHOD OF USING THE SAME

Filed June 7, 1943

INVENTOR
WALTER L. SCHWARTZ

Patented Apr. 11, 1944

2,346,192

UNITED STATES PATENT OFFICE 2,346,192

SPUR CENTER HEAD AND METHOD OF USING THE SAME

Walter L. Schwartz, Dayton, Ohio

Application June 7, 1943, Serial No. 489,946

2 Claims. (Cl. 142—1)

(Granted under the act of March 3, 1883, as amended April 30, 1928; 370 O. G. 757)

The invention described herein may be manufactured and used by or for Government for governmental purposes, without the payment to me of any royalty thereon.

This invention relates to spur center heads for use in turning work such as wood, plastics, etc., in lathes, and to a method of using the same. One object of the invention is to provide a method and means for turning work which has two halves temporarily united for the turning operation, the device permitting the work to be turned about its true center and preventing slipping or shifting of the work. Another object is to provide a spur center head which permits the work to revolve, hence may be used in the tailstock of a lathe. Other objects are to provide a revolving spur center head which does not require lubrication and which will permit rapid turning without danger of burning or charring the work at the tailstock. The device of the invention is very simple and inexpensive and is designed to give good service for a considerable period.

In the accompanying drawing showing a preferred embodiment of the invention—

Figure 1:
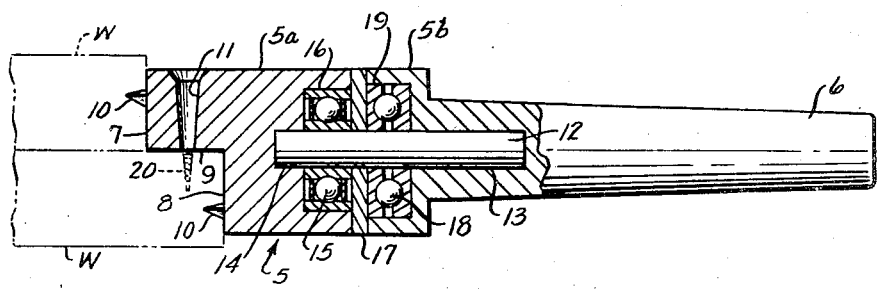
Fig. 1 is a sectional elevation of a spur center head of the revolving type, the work being indicated in dot and dash lines.
Figures 2, 3:
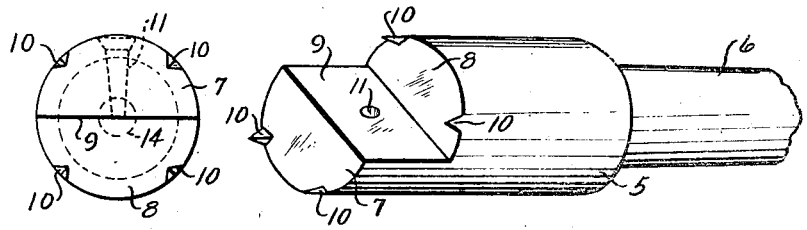
Fig. 2 is an end elevation, the view being from the left end of Fig. 1.
Fig. 3 is a perspective view of a non-revolving spur center head, for use in the headstock of a lathe.

Referring particularly to the drawing, both forms of the spur center head comprise a cylindrical body 5 having at one end a tapered shank 6 as is conventional. At its other end the spur center head is stepped, that is, it has an end face 7 separated from end face 8 by a diametrical face 9. Both end faces are square and hence the diametrical face 9 is at right angles to each. Spurs or dogs 10 are shown as projecting from the end faces to grip the work, although with some materials these may not be used. A cavity 11 shaped like a wood screw is formed in the projecting portion of the stepped end and extends at right angles to the longitudinal axis of the spur center head.

The revolving center head for the tailstock is formed by making body 5 in two parts, 5a, 5b, and interposing radial and thrust bearings between the parts. A dowel 12 is press-fitted in a bore 13 in the tapered shank and also fits a bore 14 in part 5a. A radial ball bearing 15 is press-fitted on dowel 12 and is likewise fitted within a counterbore 16 coaxial with bore 14. Interposed between parts 5a and 5b of the body is an "Oilite" or other similar self-lubricating bearing 17 in the form of a washer whose central hole is of the proper size to fit the dowel. A thrust ball bearing 18 fits a counterbore 19 in part 5b. Pressure from the end thrust on the "Oilite" bearing is entirely effective for lubricating both bearings and no additional lubricant need be used.

The work W, which is in two halves joined together along the longitudinal axis by glue, screws, etc. (not shown), is arranged so that each end is stepped also to fit the stepped end of the corresponding center head. A wood screw 20 may pass through cavity 11 to secure the work rigidly to each center head. When spurs are used they will pierce the ends of the work and assist in turning it or holding it immovably on the end of the center head.

By employing the described method the center of the work is established quickly and accurately, hence turning is accomplished more accurately. At the tailstock end nearly all heat and friction are eliminated, which is advantageous because excessive heat often throw the work off center and sometimes chars or burns the work. The stepped ends of the work permit a very secure fastening of the work to the center heads so that slipping and shifting of the work are obviated; and this result is obtainable without necessarily using the spurs.

Obviously the invention may be embodied in several forms neither described nor shown.

Having described the invention, what I claim as new and desire to secure by Letters Patent is:

1. The method of preparing a piece of stock divided longitudinally in two equal parts for turning, which comprises moving one of the halves of the stock longitudinally relative to the other and then securing the halves temporarily with both of their ends in stepped relation; securing one of the stepped ends to a center head fitting against the three faces of the stepped end, said center head being adapted to be united with the headstock of a lathe; and securing the other stepped end against a second center head also fitting the three faces of the other stepped end, said second center head being adapted to be united to the tailstock of the lathe and having the part which fits the other stepped end revolvable relative to the tail stock.

2. A revolving center for rotatably supporting a workpiece of wood or like material in a lathe for turning operations on the workpiece comprising a shank adapted to be received in the headstock or tailstock of the lathe; a head secured to said shank; said head having longitudinally spaced end faces adapted to abut the workpiece; work securing spurs on said end faces; a longitudinally extending shelf portion between said end faces and coplanar with the axis of rotation of said head; and means associated with said head for clamping a portion of said workpiece to said longitudinally extending shelf portion.

WALTER L. SCHWARTZ.